(12) United States Patent
Ciprian

(10) Patent No.: US 10,081,435 B2
(45) Date of Patent: Sep. 25, 2018

(54) ENGINE COWLING

(71) Applicant: Rolls-Royce Deutschland Ltd & Co KG, Blankenfelde-Mahlow (DE)

(72) Inventor: Ispir I. Ciprian, Blankenfelde-Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 33 days.

(21) Appl. No.: 15/378,924

(22) Filed: Dec. 14, 2016

(65) Prior Publication Data
US 2017/0174354 A1  Jun. 22, 2017

(30) Foreign Application Priority Data

Dec. 22, 2015  (DE) .................. 10 2015 226 546

(51) Int. Cl.
*B64D 29/08* (2006.01)
*B64D 29/06* (2006.01)
*E05D 7/00* (2006.01)

(52) U.S. Cl.
CPC ............ *B64D 29/08* (2013.01); *B64D 29/06* (2013.01); *E05D 7/0018* (2013.01)

(58) Field of Classification Search
CPC ........ B64D 29/08; B64D 29/06; B64D 29/00; E05D 7/0018; Y10T 16/5329
See application file for complete search history.

(56) References Cited

U.S. PATENT DOCUMENTS

| | | | | |
|---|---|---|---|---|
| 1,465,912 A * | 8/1923 | Jensen | ............... | E05D 11/1078 16/330 |
| 2,685,469 A | 8/1954 | Butler | | |
| 3,019,472 A | 2/1962 | Wasmuth | | |
| 4,035,093 A * | 7/1977 | Redshaw | ............... | F16B 5/0225 16/237 |
| 4,156,301 A * | 5/1979 | Schneider | ............ | E05D 5/0276 16/249 |
| 5,933,919 A * | 8/1999 | Miller | ................... | E05D 7/0018 16/241 |

(Continued)

FOREIGN PATENT DOCUMENTS

| | | |
|---|---|---|
| DE | 29710853 U1 | 11/1998 |
| DE | 60021244 T2 | 4/2006 |

(Continued)

OTHER PUBLICATIONS

European Search Report dated May 16, 2017 from counterpart European App No. 16205410.0.

(Continued)

*Primary Examiner* — Justin B Rephann
(74) *Attorney, Agent, or Firm* — Shuttleworth & Ingersoll, PLC; Timothy Klima

(57) ABSTRACT

An engine cowling, comprising a housing part, at least one door element, and a hinge, wherein the hinge fixates the door element at the housing part in an openable and closable manner, wherein the hinge includes a first hinge element, a second hinge element and a bolt, and wherein the hinge includes an adjustment device that can be adjusted in such a manner that a relative position of the door element to the housing part can be altered.

8 Claims, 6 Drawing Sheets

(56) References Cited

U.S. PATENT DOCUMENTS

Figure 1:
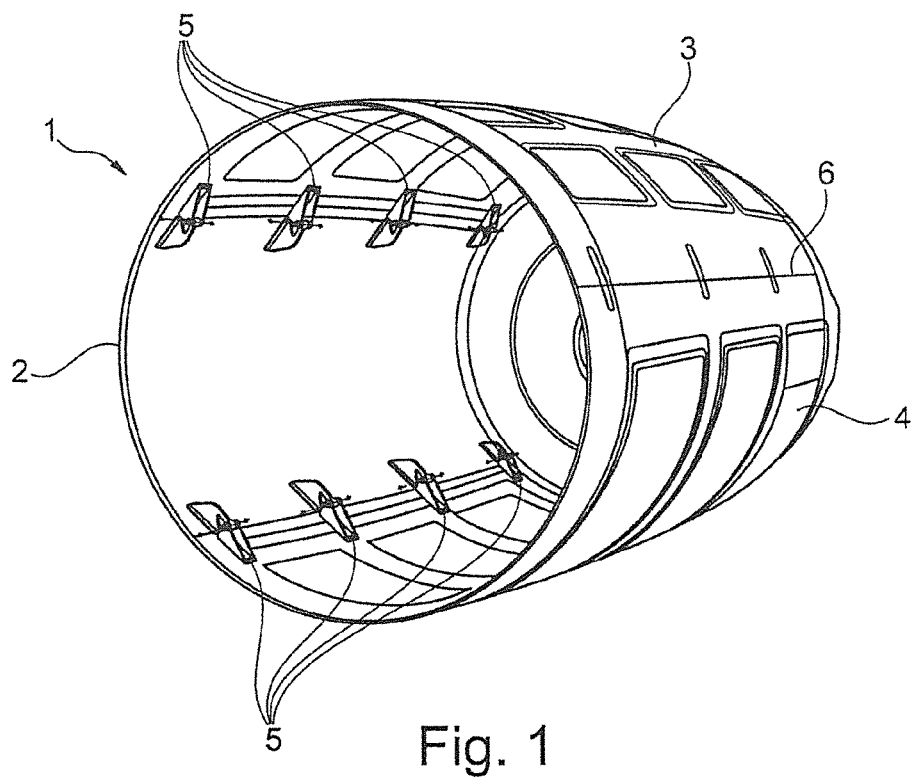

| | | | | |
|---|---|---|---|---|
| 6,152,554 | A * | 11/2000 | Parisi | E05D 7/04 16/249 |
| 6,227,485 | B1 * | 5/2001 | Porte | B64D 29/08 244/53 B |
| 6,666,408 | B1 | 12/2003 | De Carvalho et al. | |
| 8,910,449 | B2 * | 12/2014 | Burke | F16B 43/02 411/368 |
| 2004/0227033 | A1 | 11/2004 | Picard et al. | |
| 2007/0169311 | A1 | 7/2007 | Franchini | |
| 2008/0099601 | A1 | 5/2008 | Christman | |
| 2009/0173823 | A1 | 7/2009 | Shetzer | |
| 2015/0110613 | A1 * | 4/2015 | Aten | B64C 7/02 415/182.1 |
| 2016/0090185 | A1 * | 3/2016 | Ambite Iglesias | B64D 29/08 244/53 R |

FOREIGN PATENT DOCUMENTS

| | | |
|---|---|---|
| DE | 102006060586 A1 | 7/2007 |
| EP | 1598510 A2 | 11/2005 |
| WO | WO9302920 A1 | 2/1993 |
| WO | WO2012047103 A1 | 4/2012 |

OTHER PUBLICATIONS

German Search Report dated May 23, 2016 for counterpart German Application No. 10 2015 226 546.3.

\* cited by examiner

ENGINE COWLING

This application claims priority to German Patent Application DE102015226546.3 filed Dec. 22, 2015, the entirety of which is incorporated by reference herein.

DESCRIPTION

The present invention relates to an engine cowling with adjustable door elements for facilitating exact closing of the door elements at the engine cowling.

Engine cowlings, in particular aircraft engine cowlings, usually comprise large door elements which are connected through hinges to a housing part of the engine cowling. Usually two door elements are provided which can be swung out into opposite directions in order to facilitate the best possible access to the engine during maintenance work. In this process, the problem may occur that it may become impossible to close the door elements exactly, or that a large gap is present between the closed door elements or the door element and the housing part of the engine cowling. In such cases, there is the danger that a mechanic damages the door element and/or the housing part when trying to lock them.

Thus, it is the objective of the present invention to provide an engine cowling which provides the option of adjusting a relative position between a housing part and a door element of the engine cowling in the opened and/or closed state while also having a simple design and simple, cost-effective manufacturability.

This objective is solved by an engine cowling having features as disclosed herein, with further developments also disclosed herein.

The engine cowling with the features disclosed herein has the advantage that a relative adjustment and consequently an adjustment of a position of a door element relative to a housing part of an engine cowling is possible in the opened and/or closed state of the door element. In this way, production-related gaps or overlapping can be compensated for by means of the adjustable position of the door element. In addition, geometrical changes in the door element and/or the housing part, which may occur at the engine cowling for example due to the temperatures during operation, can be compensated. According to the invention, this is achieved by the engine cowling having at least one hinge that fixates the door element at the housing part in an openable and closable way. The hinge comprises a first and a second hinge element as well as a bolt. The hinge further comprises an adjustment device which can be adjusted in such a manner that a relative position of the door element to the housing part can be altered. In this way, a gap or an overlapping between the door element and the housing part can be compensated through the invention by means of the adjustable hinge. As, due to its size, the door element is usually fixated at the housing part with multiple hinges, preferably all hinges are embodied in an adjustable manner.

The adjustment device is preferably configured to adjust a position of the bolt relative to the first or second hinge element. At that, the bolt is preferably adjusted exclusively in a direction perpendicular to a bolt axis.

Further, the first hinge element preferably comprises a first passage opening for receiving the bolt, wherein the bolt is arranged at zero clearance inside the first passage opening. Further, the second hinge element comprises a second passage opening which receives the bolt with clearance. Here, the clearance is provided in such a manner that the bolt is adjustable perpendicular to the bolt axis.

According to a further preferred design of the invention, the adjustment device comprises at least one first rib structure with a plurality of first ribs and a plurality of second ribs, with the first and second ribs meshing. Here, an adjustment can be carried out in such a manner that the meshing position between the two rib arrangements is altered by offsetting the first ribs relative to the second ribs. Here, the accuracy of the adjustment device can be adjusted through the design of the rib's width.

In particular it is preferable if the first ribs and the second ribs of the first rib structure are arranged so as to be respectively parallel to each other. In this way, a simple and quick adjustment can be facilitated.

According to another preferred embodiment of the invention, the adjustment device further comprises a second rib structure with a plurality of third ribs and a plurality of fourth ribs, with the third and fourth ribs meshing. Here, the first and second rib structures facilitate an adjustment of the door element relative to the housing part in one plane, i.e. in a first direction by means of the first rib structure, and in a second direction by means of the second rib structure. Here, the two directions define the adjustment plane, where it is particularly preferred that the adjustment plane is perpendicular to a bolt axis.

In particular it is preferred if the first rib structure and the second rib structure are arranged perpendicular to each other. In this way, a simple and easily discernible adjustment of the relative position between door element and housing part can be achieved.

To provide for a simple adjustability, the distances between the first and second ribs as well as between the third and fourth ribs are respectively identical.

Preferably, the first rib structure and/or the second rib structure are doubly provided. In this way, a redundancy of the rib structures is obtained, and further a secure fixation of an adjusted position between the ribs is obtained due to the increased number of ribs as compared to a mere onefold arrangement. The double arrangement of the first and second rib structures is preferably provided at an opening and offset from it by 180°.

For a particularly compact design, the first ribs are preferably arranged directly at the hinge element. Here, the second ribs are arranged at a structural component that is connected to the bolt. Thus, the number of parts of the hinge according to the invention can be kept low, and therefore particularly manufacturing and mounting costs can be kept at a low level.

Alternatively, the first ribs are arranged at a first intermediate structural component that is connected to the first hinge element. Here, the use of the intermediate structural component facilitates individual adjustment of the adjustment device for different operational purposes, in particular for different engine customers or for different sizes of engines.

Further, it is preferred that the first and second rib structures are arranged in a plane which is perpendicular to a bolt axis. In this way, a safe and easy adjustability of the adjustment device can be guaranteed.

Preferably, the ribs have a tapering cross-section. In particular, the ribs have a substantially triangular cross-section, with the triangular cross-section preferably being an equilateral cross-section or an isosceles cross-section.

Further, it is preferred that the engine cowling has exactly one first and one second door element, which are arranged at the housing part by means of a plurality of adjustable hinges. The first and second door elements can preferably be opened and closed in opposite directions, so that a large section of the engine can be exposed by opening the two door elements. As a result, maintenance work can be rendered significantly easier. The door elements are preferably provided along the entire axial length of the engine.

Further, it is preferred that the hinge comprises at least one washer in order to also facilitate an adjustment of the hinge in the direction of the bolt axis. The bolt axis preferably extends in parallel to the axial direction of the engine cowling.

The engine cowling according to the invention is preferably an aircraft engine cowling.

Figure 2:
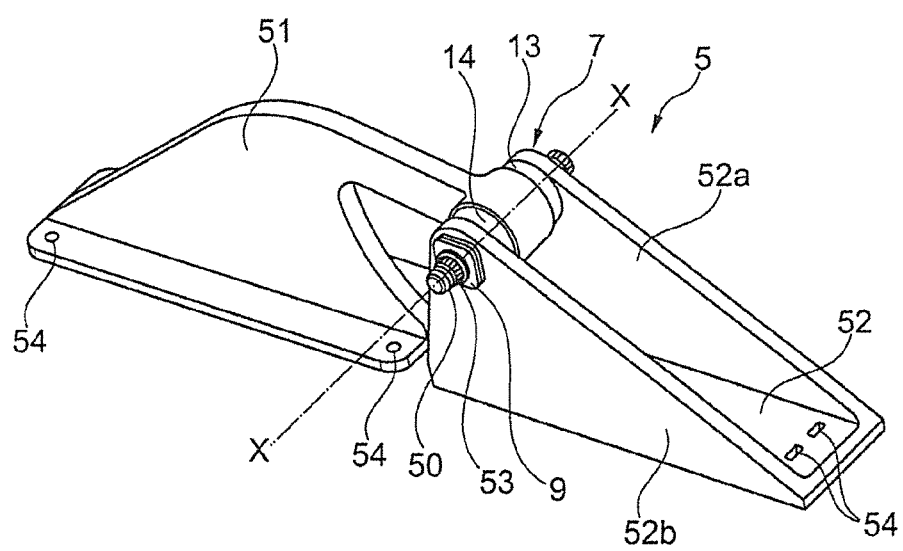
Figure 3:
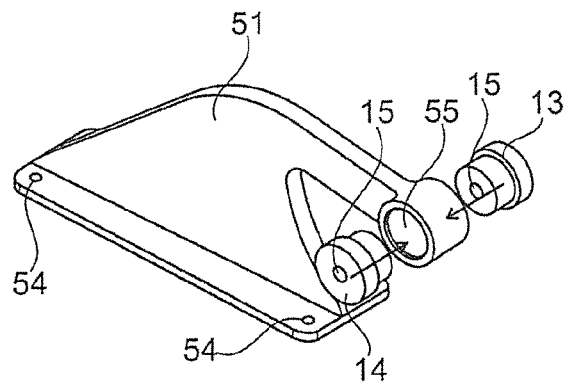
Figure 4:
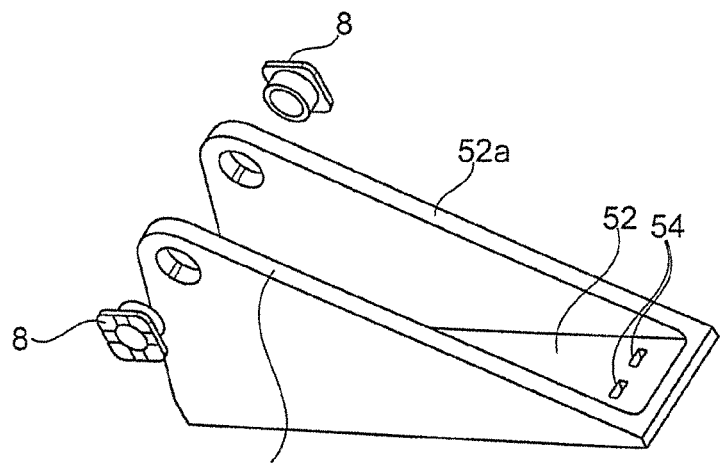
Figure 5:
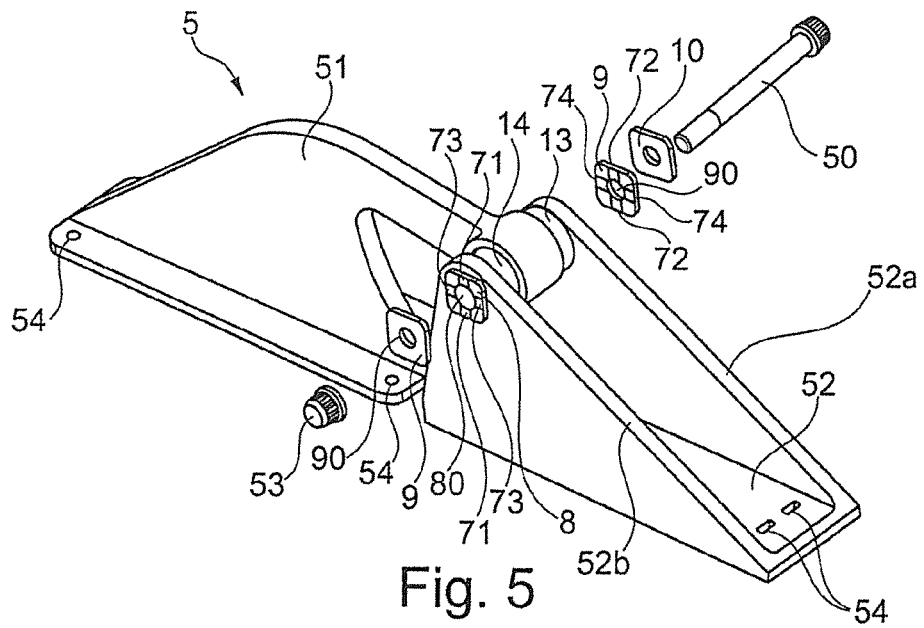
Figure 6:
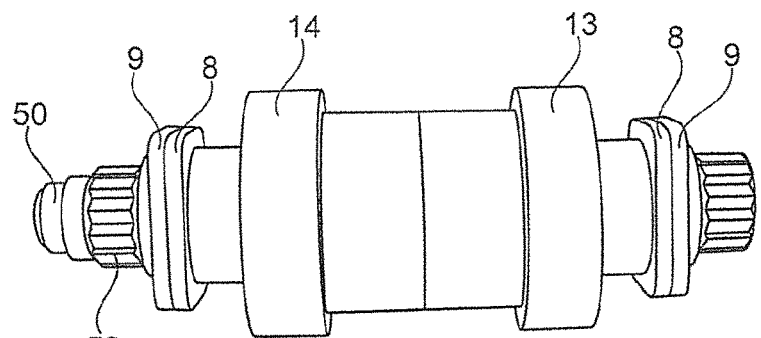
Figure 7:
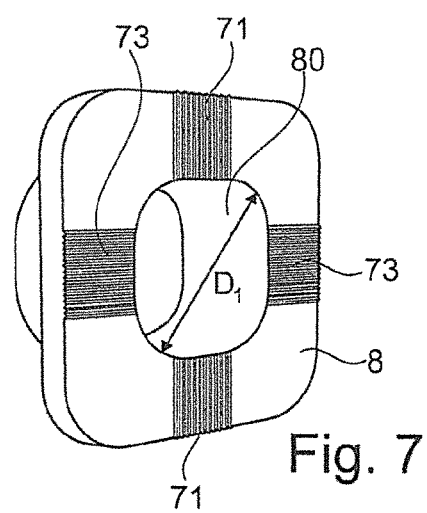
Figure 8:
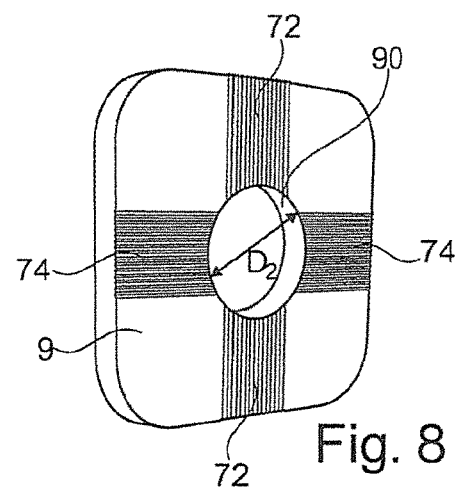
Figure 9:
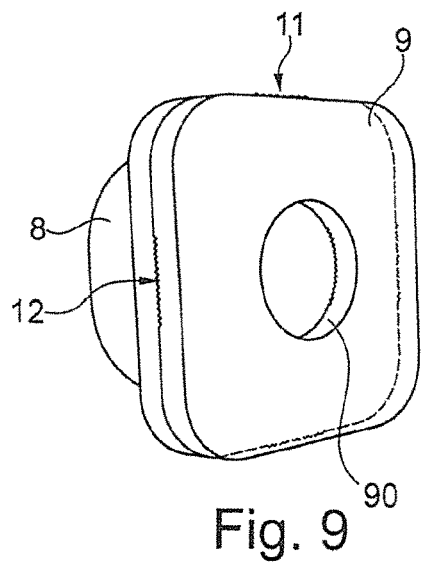
Figure 10:
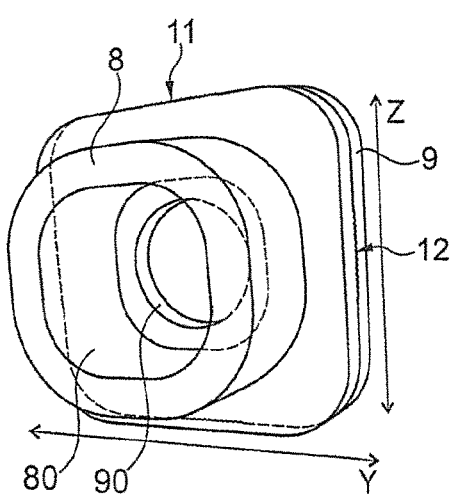
Figure 11:
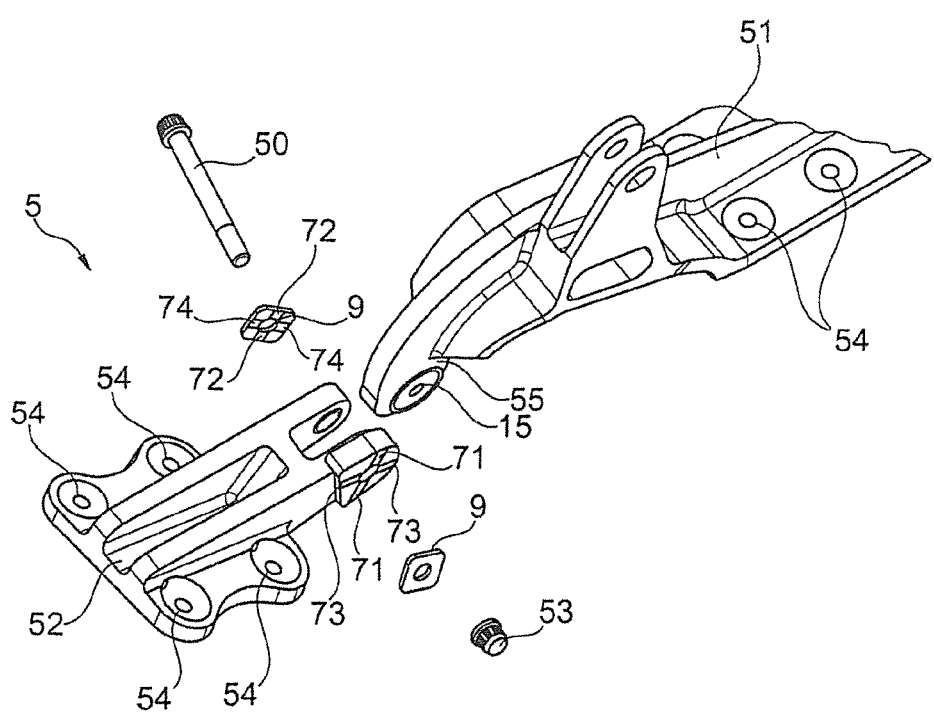

In the following, preferred exemplary embodiments of the invention are described in detail by referring to the accompanying drawing. In the drawing, identical or functionally identical parts are identified by the same reference signs. In the drawings:

FIG. 1 shows a schematic perspective view of an engine cowling according to a first exemplary embodiment of the invention, FIG. 2 sows a schematic perspective view of a hinge of FIG. 1, FIG. 3 shows a schematic perspective view of a first hinge element of the hinge of FIG. 2, FIG. 4 shows a schematic perspective view of a second hinge element of the hinge of FIG. 2, FIG. 5 shows a schematic exploded view of the hinge of FIG. 2, FIG. 6 shows a top view of the hinge of FIG. 2, FIG. 7 shows a perspective view of an intermediate structural component of the hinge of FIG. 2 with a first part of an adjustment device, FIG. 8 shows a perspective view of a disc of the hinge of FIG. 2 with a second part of the adjustment device, FIGS. 9 and 10 show perspective views of the adjustment device of FIGS. 7 and 8 from different sides, and FIG. 11 shows a schematic perspective view of a hinge according to a second exemplary embodiment of the invention.

Figure 12A:
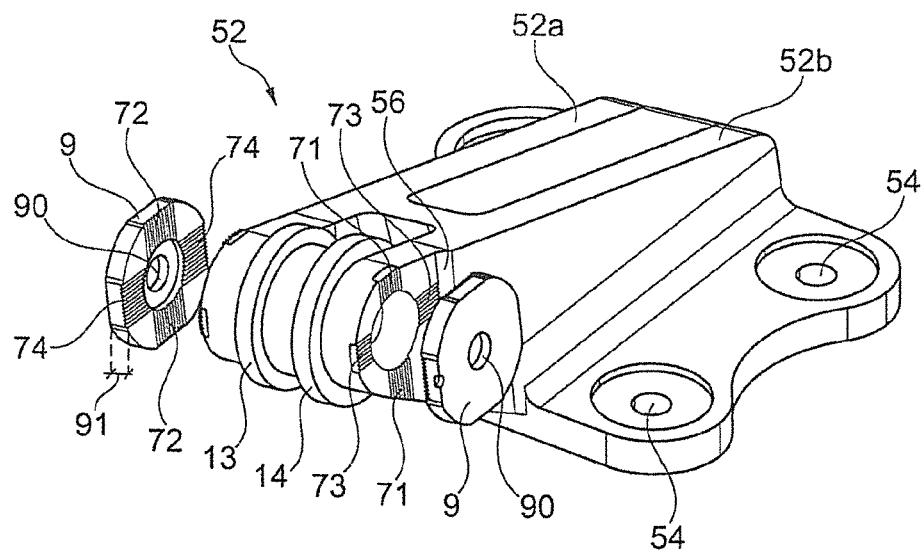
Figure 12B:
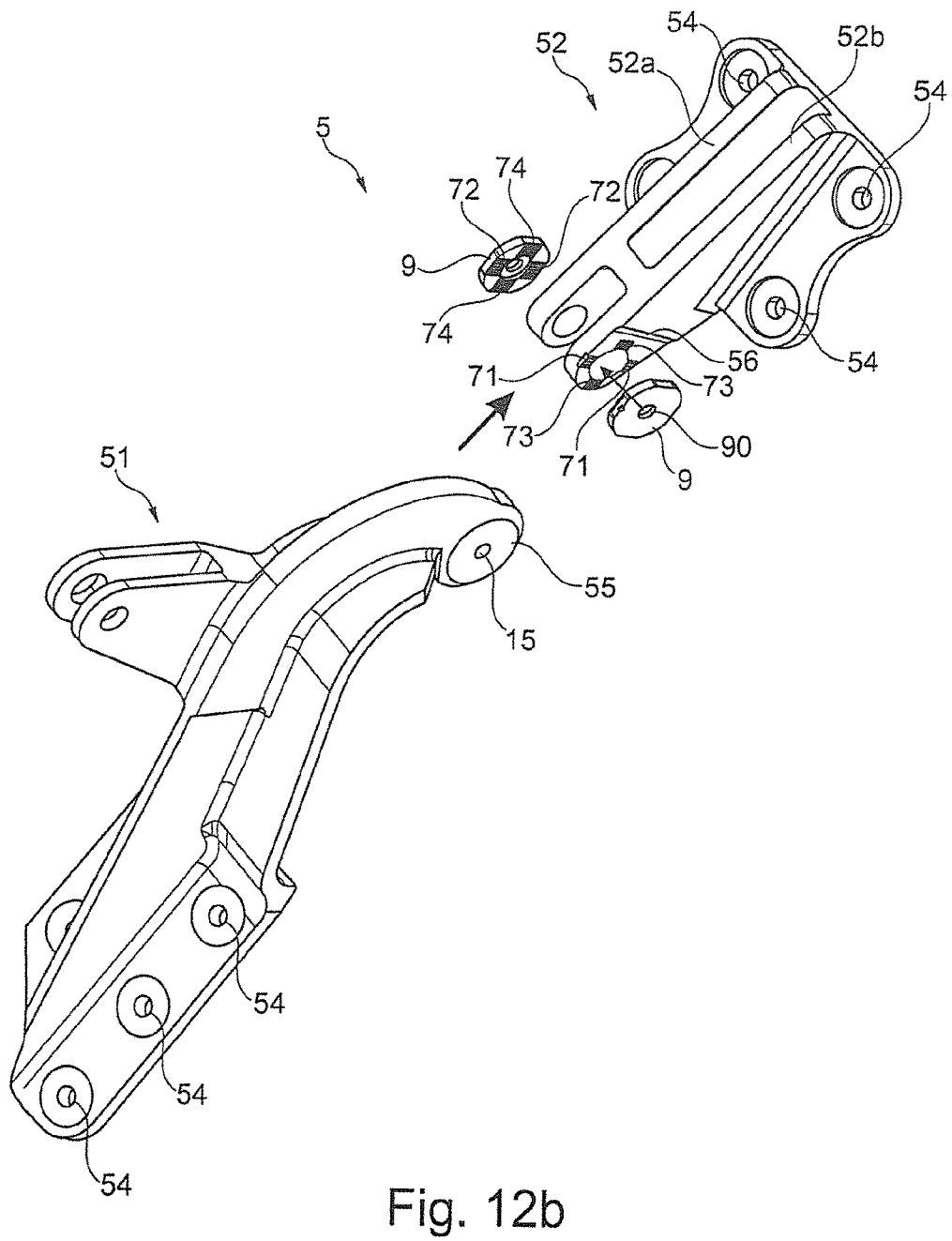

FIGS. 12a and 12b show schematic perspective views of a second hinge element or of a hinge according to a third exemplary embodiment of the invention, and FIGS. 13a, 13b and 14a, 14b show schematic views of different embodiments of rib structures that can be used in all the described exemplary embodiments.

In the following, an engine cowling 1 according to a first preferred exemplary embodiment of the invention is described in detail by referring to FIGS. 1 to 10.

FIG. 1 schematically shows a perspective view of an engine cowling 1 which forms a barrel-shaped housing around an engine that is not shown. The engine cowling 1 comprises a housing structural part 2, a first door element 3, as well as a second door element 4. The first door element 3 is hinged at the housing part 2 by means of a plurality of hinges 5. The second door element 4 is also hinged at the housing part 2 with a plurality of hinges 5. The housing part 2 is attached to an aircraft or the like. The door elements abut at an abutting edge 6.

The door elements extend along the entire axial length of the engine cowling 1.

As can be seen from FIG. 1, the two door elements 3, 4 are both embodied with the same size and respectively cover a circumferential surface that is approximately twice the size of the circumferential surface of the housing part 2. In this manner, a large opening area can be obtained when the two door elements 3, 4 are opened into opposite directions, so that maintenance work or the like performed at the engine can be carried out in an easy manner.

In this exemplary embodiment, exactly four hinges 5 are respectively provided at the housing part 2 for fixating each door element 3, 4.

The hinge 5 can be seen in detail in FIGS. 2 to 5. The hinge 5 comprises a first hinge element 51, a second hinge element 52 and a bolt 50. The bolt 50 connects the first hinge element 51 to the second hinge element 52. The bolt 50 is secured by means of a nut 53. Each of the two hinge elements 51, 52 has attachment holes 54 to facilitate fixating the hinge at the housing part 2 or at the door elements.

The first hinge element 51 has an eye 55 inside of which a first spacer 13 and a second spacer 14 are arranged. The two spacers 13, 14 respectively have a passage opening 15, with its diameter corresponding to the diameter of the bolt 50 in such a manner that the bolt 50 is received therein at zero clearance. The two spacers 13, 14 position the first hinge element 51 between the two legs 52a, 52b of the second hinge element 52. In order to achieve a great variability, the two spacers 13, 14 are provided, which then can be respectively combined with another second hinge element 52, for example of another engine cowling, and are selected corresponding to a distance of the legs at the second hinge element.

Further, the hinge 5 comprises an adjustment device 7 which alters the relative position between the door element 3, 4 and the housing part 2 in a resting position of the hinge.

The adjustment device 7 comprises a first rib structure 11 and a second rib structure 12.

At the second hinge element 52, two separate intermediate structural components 8 are provided, on which a first part of the first rib structure 11 and of the second rib structure 12 are provided. A second part of the first and second rib structure 11, 12 is embodied on a separate disc 9. Here, an inner diameter D1 of a first opening 80 of the intermediate structural component 8 is significantly larger than a diameter of the bolt 50. A diameter D2 of a second opening 90 at the disc 9 corresponds to an external diameter of the bolt 50 in such a manner that the bolt is arranged at zero clearance inside the second opening 90.

Here, the first opening 80 in the intermediate structural component 8 does not have to be circular, but can also be quadrangular with rounded corners.

The first rib structure 11 comprises first ribs 71 and second ribs 72. The first ribs 71 are provided at the intermediate structural component 8. The second ribs 72 are provided at the disc 9. As can be seen from FIGS. 7 and 8, the first and second ribs 71, 72 are doubly provided, respectively. Here, the first and second ribs extend linearly in the vertical direction and are provided at the respective openings 80, 90 and are offset from them by 180°.

The second rib structure 12 comprises third ribs 73 and fourth ribs 74. The third ribs 73 are provided at the intermediate structural component 8, and the fourth ribs 74 are provided at the disc 9. The third and fourth ribs are also linearly embodied and are provided at the respective openings 80, 90 and offset from them by 180°, but they extend in the horizontal direction. Thus, the first and second ribs 71, 72 are perpendicular to the third and fourth ribs 73, 74.

In other words, the ribs 71, 72, 73, 74 of the two rib structures 11, 12 are provided in a crosswise arrangement around a respective centric opening in the structural component.

FIGS. 9 and 10 show the mounted state of the intermediate structural component 8 and the disc 9. Here, the first ribs 71 mesh with the second ribs 72, and the third ribs 73 mesh with the fourth ribs 74. Thus, the two rib structures 11, 12 define an adjustment plane that is perpendicular to the axis of the bolt 50.

Thus, as can be seen in FIG. 10, a relative position between the intermediate structural component 8 and the disc 9 can respectively be altered through shifting the positions of the intermediate structural component 8 with respect to the disc 9. Here, a shift is possible in the Y-direction as well as in the Z-direction. Thus, depending on a width of the ribs, a very exact adjustability can be achieved between the first hinge element 51, which is connected to the bolt 50 via the two spacers 13, 14, wherein the bolt 50 is mounted in the two discs 9, and the second hinge element 52, which is connected to the adjustment device 7 via the intermediate structural component 8. An adjustment of the adjustment device 7 through the lateral shift of the disc 9 in the Y- and/or Z-direction relative to the intermediate structural component 8 thus also results in a shift of the position of the bolt 50, and through the connection to the first hinge element 51 also a relative position between the two hinge elements 51, 52.

Thus, adjustability in an engine cowling 1 can be achieved by means of the hinge 5. In this way, any inaccuracies or warpage of the housing part 2 relative to the door elements 3, 4, which may occur due to long operation durations, can be compensated. In this manner, a possibility to compensate any gap or overlap between the housing part 2 and the door elements 3, 4 is obtained.

It is to be understood that clearance fits with small tolerance should preferably be chosen to ensure that the clearance between the bolt 50 and the openings 90 in the disc 9 or the passage openings 15 in the spacers 13, 14 is as small as possible.

Further, it should be understood that, through the provision of other additional discs 10 with openings for receiving the bolt, the hinge 5 also has an adjustment option in the direction of a bolt axis X-X. Here, the additional discs 10 can be provided at the spacers 13, 14 or the discs 9.

FIG. 11 shows a hinge 5 of an engine cowling 1 according to a second exemplary embodiment of the invention.

In contrast to the first exemplary embodiment, in the second exemplary embodiment, the first part of the adjustment device 7 is not provided at an intermediate structural component or the like, but directly on the second hinge element 52. In other words, the first ribs 71 and the third ribs 73 are provided directly at the second hinge element 52. Thus, the intermediate structural component 8 of the first exemplary embodiment can be dispensed with. The second part of the adjustment device 7 is provided at the disc 9, just like in the first exemplary embodiment. Also, no spacers 13, 14 are provided. Thus, the number of parts of the adjustment device 7 can be reduced, so that the engine cowling can be manufactured and in particular also mounted more easily. Also, an adjustment of the adjustable hinge 5 is easier, since the danger of losing parts is reduced.

Thus, as shown in the described exemplary embodiments, what is provided according to the invention is an adjustable hinge 5 that secures the door elements 3, 4 of an engine cowling 1 in a pivotable manner. Here, an adjustment can be carried out by means of an adjustment device 7 in the opened or closed state in two directions, namely in the Z-direction, i.e. the vertical direction, and the Y-direction, i.e. the horizontal direction, or in both directions. Further, an adjustment in the direction of a bolt axis (X-X-direction) can also be carried out by providing additional discs 10. Here, the bolt 50 is mounted at the second hinge element 52 as well as the second part of the adjustment device 7 at the discs 9. A relative shift of the disc 9 towards the intermediate structural component 8 or the first and third ribs 71, 73 that are provided directly on the second hinge element 52 thus facilitates a relative adjustment between the first and second hinge element 51, 52.

In the exemplary embodiments, the ribs 71, 72, 73, 74 of the two rib structures 11, 12 are embodied in a linear manner. Here, a cross-section of the ribs is tapering, preferably trapezoid or triangular. The narrower a base of the provided ribs, the smaller the adjustment steps between the hinge elements can be designed.

FIGS. 12a and 12b show a second hinge element 52 of a hinge according to a third exemplary embodiment of the invention in a schematic manner. The third exemplary embodiment substantially corresponds to the second exemplary embodiment, wherein the first ribs 71 and the third ribs 73 are again provided directly at the second hinge element. As can be seen from FIG. 12a, the first and third ribs are provided at a recess 56. Here, the depth of the recess 56 corresponds to a thickness 91 of the disc 9. Thus, when the disc 9 is mounted, this results in a flat lateral surface with respect to the two legs 52a, 52b of the second hinge element 52. In this manner, an even more compact structure can be achieved. Further, in the third exemplary embodiment, a first and a second spacer 13, 14 are additionally provided (shown only in FIG. 12a) that receive an eye 55 of a first hinge element 51 in between each other. Thus, also the third exemplary embodiment has a reduced number of parts and can further have an even more compact and simple structure, which can in particular be mounted in an even faster and more cost-efficient manner.

Figures 13A, 14A:
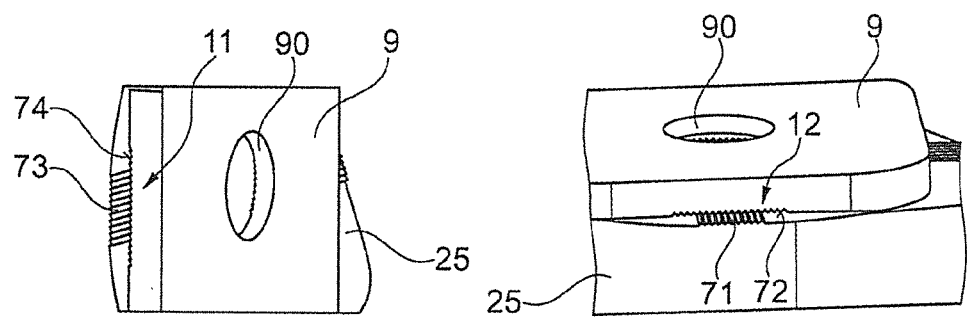
Figure 13B:
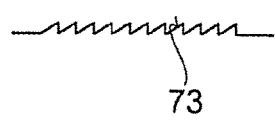
Figure 14B:
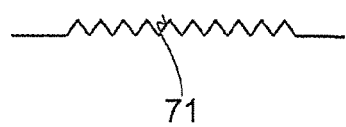

FIGS. 13a, 13b and 14a, 14b show two exemplary illustrations of rib structures 11, 12. The rib structure shown in FIGS. 13a and 13b has ribs that are triangle-shaped in section, wherein a right angle of the triangle-shaped ribs is provided at a base area. This results in an asymmetrical profile which can be mounted correctly only in one direction. In contrast to that, FIGS. 14a and 14b show a profile for a rib structure that is symmetrical. Here, a right angle is provided at a tip of the respectively triangle-shaped ribs. In this manner, any assembly defects or damage during mounting of the discs 9 can be avoided. It is to be understood that the rib structures shown in FIGS. 13a, 13b and 14a, 14b can be used in all described exemplary embodiments. Further, it is to be understood that it is likewise possible to use different first and second rib structures at the hinge elements 51, 52. For example, the rib structure shown in FIGS. 13a and 13b can be used in a horizontal direction, and the rib structure shown in FIGS. 14a and 14b can be used in a vertical direction. At that, the shape of the ribs can also be selected in compliance with the geometric shape of the metric coarse-pitch threads.

PARTS LIST 1 engine cowling
2 housing part
3 first door element
4 second door element
5 hinge
6 abutting edge
7 adjustment device
8 intermediate structural component
9 disc
10 additional disc
11 first rib structure
12 second rib structure 13 first spacer
14 second spacer
15 passage opening
50 bolt
51 first hinge element
52 second hinge element
52a, 52b legs
53 nut
54 attachment holes
55 eye
56 recess
71 first ribs
72 second ribs
73 third ribs
74 fourth ribs
80 opening
90 opening
91 thickness of the disc 9
D1 first diameter
D2 second diameter
X-X bolt axis

The invention claimed is:

1. An engine cowling, comprising:
a housing part,
at least one door element, and
a hinge,
wherein the hinge fixates the door element at the housing part in an openable and closable manner,
wherein the hinge comprises a first hinge element, a second hinge element and a bolt, and
wherein the hinge comprises an adjustment device which can be adjusted in such a manner that a relative position of the at least one door element to the housing part can be altered,
wherein the adjustment device comprises a first rib structure arranged at the bolt, the first rib structure including a plurality of first ribs and a plurality of second ribs, wherein the plurality of first ribs mesh with the plurality of second ribs,
wherein the adjustment device comprises a second rib structure arranged at the bolt, the second rib structure including a plurality of third ribs and a plurality of fourth ribs, wherein the plurality of third ribs mesh with the plurality of fourth ribs,
wherein the first rib structure is arranged perpendicular to the second rib structure.

2. The engine cowling according to claim 1, wherein the adjustment device adjusts a position of the bolt relative to at least one chosen from the first hinge element and the second hinge element.

3. The engine cowling according to claim 1, wherein the first hinge element includes a first opening for receiving the bolt with zero clearance, and the second hinge element includes a second opening that receives the bolt with clearance.

4. The engine cowling according to claim 1, wherein at least one chosen from the first rib structure and the second rib structure includes two spaced apart sets of ribs.

5. The engine cowling according to claim 1, and further comprising a structural element connected to the bolt, wherein the first ribs are positioned at the first hinge element, and the second ribs are arranged at the structural component.

6. The engine cowling according to claim 1, and further comprising an intermediate structural component connected to the first hinge element, wherein the first ribs are arranged at the intermediate structural component.

7. The engine cowling according to claim 1, and further comprising washers for facilitating a relative position between the first hinge element and the second hinge element in a direction of the bolt axis.

8. The engine cowling according to claim 1, wherein the first rib structure and the second rib structure form a cross surrounding the bolt.

\* \* \* \* \*